United States Patent Office 2,952,662
Patented Sept. 13, 1960

2,952,662

RUBBER STABILIZATION WITH MONOHYDROXY PHENOL-INDENE OR COUMARONE ALKYLATION PRODUCT

Wilbur J. Wald, Bellevue, Pa., assignor to Neville Chemical Company, Pittsburgh, Pa., a corporation of Pennsylvania No Drawing. Filed June 25, 1957, Ser. No. 667,972

16 Claims. (Cl. 260—45.95)

This invention relates to a process for protecting rubber by means of a compounding agent having antioxidant properties, and to rubber containing said agent. More particularly, it relates to the inhibition of oxidation and aging of rubber by means of polysubstituted products of phenols and indene, coumarone, methyl indenes, methyl coumarones, and mixtures thereof.

A wide variety of compounds have been proposed for use as antioxidants in natural and synthetic rubbers and mixtures thereof. The use of antioxidants is so common as to require little comment. In general an antioxidant should not interfere or alter substantially, the curing characteristics of the rubber composition and should be capable of inhibiting the aging of the rubber in the presence of ultraviolet light and/or oxygen at the temperatures normally encountered under service conditions. They should not migrate or cause bloom or frosting, and with light colored rubber compositions should not develop stain or darkening due to exposure to oxygen, ultraviolet light and heat. Moreover, antioxidants should not impart stain upon contact.

The compounds with which this invention is concerned meet these requirements to an extent equal to and in some cases superior to competitive antioxidants which have had wide commercial acceptance.

The compounds are prepared from phenols such as the mixed commercial cresylic acids by reaction with naphthas containing indene as the principal polymerizable component, but which may include coumarone and the lower alkyl derivatives of coumarone and indene. Such naphthas are derived from coal tar, drip oil from manufactured gas processes, or from severe thermal cracking of petroleum gas oils, or other sources. Pure or substantially pure indene may be used. Pure or substantially pure phenol, cresols, and xylenols may also be used.

The condensation products may be prepared by reacting the cresylic acids and the indene-containing naphthas in the presence of a catalyst such as acidic clays or those comprising Friedel-Crafts type or their complexes with low molecular weight polar compounds such as aliphatic ethers and acids. The products are prepared by adding the naphtha to a mixture of the catalyst and the cresylic acids, usually in the presence of an aromatic solvent which can be removed from the final product by distillation at a temperature of about 150° C. to about 250° C., for a period of time such that the reaction is complete as indicated by no significant change in specific gravity of the reaction mixture when subjected to further heating within the range of 25 to 110° C. Alternatively they may be prepared by mixing the cresylic acids and the naphtha and adding the catalyst to the mixture under temperature conditions within the range mentioned. This process results in a product of lower average molecular weight. The amount of the cresylic acid employed is usually within the range of about 15% to about 20% by weight of the polymerizable portion of the naphtha. (The polymerizable portion of the naphtha is defined as that portion of the naphtha which is convertible to resins of the coumarone-indene type by the usual sulfuric acid polymerization method.) The naphthas boil in the range of about 160–200° C. and contain upwards of about 40% indene.

When the reaction is complete the solvent, if any, is removed by distillation at atmospheric pressure. The residue is then subjected to vacuum or steam distillation to remove a liquid product comprising primarily phenols alkylated with two indene groups, there possibly being small quantities of tri-substituted phenols present. The average molecular weight of the oil is in the neighborhood of about 250 or 300. The oil has a light amber color and is cut to an initial boiling point of about 300° C. or higher.

The residue is a solid which when viewed in the massive state is light amber color and may have a melting point from about 50° C. to about 100° C. or higher. This depends upon how much of the oily product is removed by distillation. Ordinarily the residue is distilled to a melting point of about 65° C. to about 95° C. It may have an average molecular weight upward from about 375, say about 400 to about 800 or more. One of the products is a liquid and the other is a solid and they are not exactly equivalent. The structural composition is believed to include the following

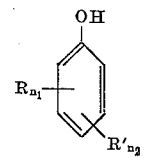

where R is a radical selected from the group consisting of indene, coumarone, and their methyl substituted homologs or their dimers or trimers such as diindene or dicoumarone; and R' is hydrogen or a low molecular weight alkyl group containing 1 to 3 carbon atoms; and where $n_1$ is a whole number equal to at least 2 where R is a monomer; or at least 1 where R is a dimer or trimer; and $n_2$ is a small whole number from 0-3. R is attached at the $\alpha$ or $\beta$ position of the 5-membered ring either by addition or substitution; i.e. with or without two unsaturated double bonds in the 5-membered ring in the final alkylate.

They are compounded with either natural or synthetic rubber or mixtures thereof in the usual manner by mixing the antioxidants into the compounded rubber in proportions of about 0.5% to about 5% by weight and preferably about 0.75% to about 2% by weight of the rubber. They are effective non-staining, non-discoloring antioxidants which do not affect the curing or vulcanizing characteristics of the rubber, and which are at least as effective in preventing adverse oxidation and aging effects as are presently available commercial antioxidants as is shown by the following examples.

EXAMPLE I

The antioxidant used in this example (Product 1) was a liquid prepared as described above which had a Gardner color of less than 9; specific gravity at 30° C. of 1.08 to 1.09; flash point by the Cleveland Open Cup method above 275° F.; and viscosity (S.S.U. at 210° F.) 50–60. It was soluble in a variety of solvents including acetic acid, acetone, aliphatic hydrocarbons, aromatic hydrocarbons, carbon tetrachloride, dioxane, ethyl acetate, ethylene glycol, gasoline, methanol, etc.

As an example of the age-retarding effect and physical properties resulting from the use of Product 1, the following natural rubber stock was prepared. The proportions are in parts by weight.

| | |
|---|---|
| Pale crepe rubber | 100.00 |
| AzO–ZZZ–55 zinc oxide | 50.00 |
| Titanium dioxide ALO | 25.00 |
| Stearic acid | 2.00 |
| Ultramarine blue | 0.125 |
| Mercaptobenzothiazole | 1.00 |
| Sulphur | 3.00 |
| Antioxidant (where used) | 1.00 |

Using this recipe Product 1 was compared with a well known non-staining antioxidant and a control containing no antioxidant. Since the curing rates at 20, 30 and 40 minutes at 274° C. were practically equal, the values of the physical properties were averaged for clearer analysis. Results are as follows:

UNAGED

| Antioxidant | Modulus | | Tensile, Lbs./Sq. In. | Elongation, Percent | Set, Percent | Hardness Shore A | T–50, °C. | Specific Gravity |
|---|---|---|---|---|---|---|---|---|
| | 200% | 500% | | | | | | |
| None | 210 | 995 | 3150 | 735 | 26 | 41 | −5.5 | 1.408 |
| Product 1 | 160 | 970 | 2985 | 730 | 23 | 41 | −6.1 | 1.407 |
| A O [1] | 185 | 975 | 3005 | 725 | 24 | 41 | −5.7 | 1.408 |

[1] Commercial antioxidant.

The same stocks were treated in an oxygen bomb for 96 hours/300# O$_2$/80° C. and then tested at room temperature. The average aged physicals for the 30, 40, and 60 minute cures are as follows:

AGED

| Antioxidant | Modulus | | Tensile, Lbs./Sq. In. | Elongation, Percent | Set, Percent | Hardness Shore A | Percent Wt. Increase | Percent of Original | |
|---|---|---|---|---|---|---|---|---|---|
| | 200% | 500% | | | | | | Tensile | Elongation |
| None | 200 | 910 | 1200 | 615 | 32 | 38 | 0.98 | 39 | 84 |
| Product 1 | 215 | 1085 | 2145 | 640 | 29 | 40 | 0.58 | 72 | 88 |
| A O [1] | 180 | 1010 | 1835 | 625 | 27 | 39 | 0.63 | 61 | 86 |

[1] Commercial antioxidant.

An ultraviolet discoloration test was then made on samples of stock cured 40 minutes at 274° F., using exposure periods of 4, 8, and 12 hours in the Weather-O-Meter (no spray). The stocks containing Product 1 and the other antioxidant discolored only very slightly as compared with the control stock containing no antioxidant.

The samples cured 40 minutes at 274° F. were placed between two white Dulux coated panels and exposed in the hot air oven for 48 hours at 70° C. under a five pound load to determine contact staining. Both of the antioxidant containing stocks showed only very slightly more staining than the control.

The above data show that Product 1 antioxidant gives equal non-staining results and better protection otherwise than a commonly used non-staining antioxidant.

EXAMPLE II

This Product 2 was the normally solid resin produced as described above. It was light amber in color, had a melting point by the capillary method above 55° C. and has specific gravity at 25/25° C. of 1.137. This product is soluble in the usual rubber solvents.

It was tested in a natural rubber composition formulated as shown in Example I, and in like proportions.

Product 2 was compared in this test compound with a well-known non-staining, non-discoloring antioxidant enjoying large volume commercial usage. A control containing no added antioxidant was also used for comparison. Since graphs of the T–50 data showed the equivalent test values to be within less than ±10% of 35 minutes at 274° F., the physicals for the 30-, 40-, and 60-minute cures were averaged for a better analysis of the properties developed. These averages are shown.

UNAGED

| Antioxidant | Modulus | | Tensile, Lbs./Sq. In. | Elongation Percent | Set, Percent | Hardness, Shore A | Specific Gravity |
|---|---|---|---|---|---|---|---|
| | 200% | 500% | | | | | |
| Product 2 | 230 | 1120 | 3240 | 735 | 28 | 42 | 1.403 |
| A.O.[1] | 245 | 1305 | 3180 | 705 | 28 | 44 | 1.398 |
| None | 270 | 1295 | 3345 | 715 | 27 | 44 | 1.403 |

[1] Commercial Antioxidant.

AGED
[Oxygen bomb 96 hours/300 p.s.i. O$_2$/80° C. (ASTM D–412 and D–572)]

| Antioxidant | Modulus | | Tensile, Lbs./Sq. In. | Elongation, Percent | Set, Percent | Hardness, Shore A | Percent Weight Increase | Percent of Original | |
|---|---|---|---|---|---|---|---|---|---|
| | 200% | 500% | | | | | | Tensile | Elongation |
| Product 2 | 230 | 1045 | 1925 | 640 | 41 | 39 | 0.83 | 59 | 87 |
| A.O.[1] | 235 | 1130 | 1920 | 615 | 38 | 40 | 0.83 | 60 | 87 |
| None | 230 | | 1120 | 520 | 37 | 38 | 1.64 | 33 | 73 |

[1] Commercial Antioxidant.

*Discoloration test.*—Ultraviolet exposure discoloration was determined in the Weather-O-Meter, without spray, at 4, 8, and 12 hours. The inhibited specimens were all in the non-discoloring class with slight differences, if any, between them. Product 2 was, therefore, the equal of presently acceptable commercial antioxidants. Test procedures employed were as follows:

Physical state of cure of vulcanized
  rubber (T–50 test) _____ ASTM D599–40T.
Tension testing of vulcanized rub-
  ber _____ ASTM D412–51T.
Accelerated aging of vulcanized
  rubber by the oxygen-pressure
  method _____ ASTM D572–52.
Contact stain of vulcanized rubber
  in contact with organic finishes,
  Method A at 70° C. and 1.67
  p.s.i. _____ ASTM D925–51T.
Resistance to accelerated light aging
  of rubber compounds (light
  only) _____ ASTM D750–43T.

EXAMPLE III

*Product 1 emulsions*

The formulations shown below should serve as excellent staring points for the emulsification and dispersion of Product 1 in many commercial applications, particularly in rubber latex compounding work:

| Component: | Parts by weight |
|---|---|
| Product 1 | 50 |
| Oleic acid | 3.0 |
| Ammonium hydroxide (NH₄OH) (28% NH₃) | 0.8 |
| Water, distilled | 20 |

*Mixing procedure.*—The oleic acid is added to the Product 1 and the ammonium hydroxide is added to the water. The ammoniated water is then slowly added in small portions to the oil with vigorous mechanical stirring. Initially a water-in-oil emulsion forms which upon the continued addition of water will invert to the oil-in-water type. After inversion the remainder of the water can be added more rapidly. This emulsion is approximately 72% solids with a pH of about 10 (pH paper). Water can readily be added to reduce the solids content.

| Component: | Parts by weight |
|---|---|
| Product 1 | 50 |
| Aerosol OT,¹ 75% (anionic) | 2 |
| Tergitol NPX² (nonionic) | 2 |
| Water, distilled | 17 |

¹ Trademark, American Cyanamid Co., sulfonated dicarboxylic acid.
² Trademark, Carbide & Carbon Chemical Corp., alkyl phenyl ether of polyethylene glycol.

*Mixing procedure.*—Both of the wetting agents are added to the Product 1. The water is then slowly added to the oil in small portions with mechanical agitation. A water-in-oil emulsion forms which, upon the further addition of water, inverts to the oil-in-water type. Again, thinning water can be added as desired. This emulsion is quite stable and shows a pH of about 8 to pH paper. To prepare a more highly alkaline emulsion of this type, it is only necessary to add about 0.5 pt. NH₄OH to the water before its addition to the oil. As a result of the nonionic agent present, this system may not be as desirable as the first emulsion system in rubber latex work, but is useful in other systems.

The first of the above emulsions was mixed with rubber latex in proportions of 1, 2 and 3 parts (of solids) per 100 parts of natural rubber hydrocarbon. They were compared with a commercial widely used antioxidant in this service (adhesive compositions). The inhibited samples were cast on sheets of polyvinyl chloride. In 7 day aging tests at room temperature the Product 1 samples were lighter than the commercial antioxidant. In ultraviolet tests (20 hours) the control was very tacky, and the Product 1 sample was less so than the commercial antioxidant sample.

In none of these tests, including the 5 day oven tests at 50° C., did the Product 1 or the commercial antioxidant stain the substrate. Product 1 rates as a non-staining, non-discoloring antioxidant of equal or superior properties to the commercial antioxidant.

*Product 2 dispersions*

The formulations shown below are dispersions of Product 2 useful in many commercial applications, particularly rubber latex compounding work:

| Component: | Parts by weight |
|---|---|
| Product 2 | 45 |
| Methocel¹ (400 cps.), 3% solution | 30 |
| Tamol 731,² 25% (anionic) | 2 |
| Water, distilled | 2 |

¹ Trademark, Dow Chemical Co., methyl cellulose.
² Trademark, Rohm & Haas, sodium aryl sulfonate.

*Mixing procedure.*—The Tamol 731 and Methocel solution are added to the pulverized Product 2. The resultant slurry is given two passes through a three-roll paint mill with the remainder of the water being added on the mill.

| Component: | Parts by weight |
|---|---|
| Product 2 | 50 |
| Darvan No. 1¹ (anionic) | 2.0 |
| Burtonite X–90² | 0.7 |
| Water, distilled | 48 |

¹ Trademark, R. T. Vanderbilt Company, Inc.
² Trademark, Burtonite Company.

*Mixing procedure.*—The Burtonite X–90 is slowly sifted into the water with mechanical agitation. Stirring is continued until a uniform mixture is obtained (about 15 to 20 minutes). The Darvan No. 1 is then added to the water phase with continued stirring. The water mixture is added to the powdered Product 2. The resultant slurry is then given two passes through a three-roll paint mill. This finished dispersion is viscous but stable. Similar results can be obtained by ball milling all of the ingredients for an estimated 24 to 48 hours.

The foregoing examples are given to illustrate the invention but are not intended to restrict it to the exact conditions shown.

I claim as my invention:

1. A process for inhibiting the oxidation and aging of rubber which comprises compounding said rubber with a small but effective amount of a compound prepared by alkylating a monohydroxy phenol having the structure

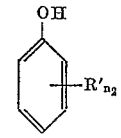

where R' is a low molecular weight alkyl group having from 1 to 3 carbon atoms and $n_2$ is a small whole number of 0–3, with a compound, R, selected from the group consisting of indene, coumarone, their methyl substituted homologs, their dimers and trimers, and combinations of said compounds, to yield a product consisting essentially of an alkylated phenol having a molecular weight of at least 250 and an initial boiling point of at least about 300° C., having the structure

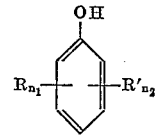

the phenyl group being attached to the five membered ring of the group R, and where $n_1$ is at least 2 when R is a monomeric group and at least 1 when R is a dimer or trimer.

2. The process of claim 1 wherein R is attached at the α position of the 5 membered ring.

3. The process of claim 1 wherein R is attached at the β position of the 5 membered ring.

4. The process of claim 1 wherein R is indanyl and $n_1$ is at least 2.

5. The process of claim 1 wherein R is a diindanyl radical and $n_1$ is at least 1.

6. The process of claim 1 wherein the antioxidant is the alkylation product of cresylic acid and an indene-containing naphtha.

7. A stabilized rubber composition containing from about 0.5% to about 5% by weight of an antioxidant comprising a substituted phenol prepared by alkylating a monohydroxy phenol having the structure

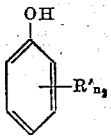

where R' is a low molecular weight alkyl group having from 1 to 3 carbon atoms and $n_2$ is a small whole number of 0–3, with a compound R, selected from the group consisting of indene, coumarone, their methyl substituted homologs, their dimers and trimers, and combinations of said compounds, to yield a product consisting essentially of an alkylated phenol having a molecular weight of at least 250 and an initial boiling point of at least about 300° C., having the structure

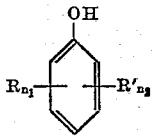

the phenyl group being attached to the five membered ring of the group R, and where $n_1$ is at least 2 when R is a monomeric group and at least 1 when R is a dimer or trimer.

8. The composition of claim 7 wherein R is attached at the α position of the 5 membered ring.

9. The composition of claim 7 wherein R is attached at the β position of the 5 membered ring.

10. The composition of claim 7 wherein R is indanyl and $n_1$ is at least 2.

11. The composition of claim 7 wherein R is a diindanyl radical and $n_1$ is at least 1.

12. The composition of claim 7 wherein the antioxidant is the alkylation product of cresylic acid and an indene-containing naphtha.

13. The composition of claim 7 wherein the antioxidant is normally liquid having an average molecular weight above about 250.

14. The composition of claim 7 wherein the antioxidant is normally solid.

15. The composition of claim 7 wherein the antioxidant is the normally liquid alkylation product of cresylic acid and an indene-containing naphtha.

16. The composition of claim 7 wherein the antioxidant is the normally solid alkylation product of cresylic acid and an indene-containing naphtha.

References Cited in the file of this patent

UNITED STATES PATENTS

| | | |
|---|---|---|
| 1,754,052 | Rosenthal | Apr. 8, 1930 |
| 1,842,989 | Kropp | Jan. 26, 1932 |
| 2,109,015 | Niederl | Feb. 22, 1938 |
| 2,606,886 | Amberg | Aug. 12, 1952 |